UNITED STATES PATENT OFFICE.

CONSTANTIN FAHLBERG, OF SALBKE-WESTERHAUSEN, GERMANY.

PROCESS OF MAKING PURE SACCHARIN.

SPECIFICATION forming part of Letters Patent No. 496,112, dated April 25, 1893.

Application filed March 23, 1892. Serial No. 426,151. (Specimens.)

*To all whom it may concern:*

Be it known that I, CONSTANTIN FAHLBERG, doctor of philosophy, a citizen of the United States, residing at Salbke - Westerhausen, Kingdom of Prussia, Germany, have invented a new and useful Improvement in the Process of Producing Pure Saccharin, whereof the following is a specification.

The crude saccharin produced according to the specification of my United States patent, Reissue No. 10,667, dated December 1, 1885, consists in a mixture of anhydro-ortho-sulphamin-benzoic acid, also called benzoic-acid-sulphinid, and parasulphamin-benzoic acid in the nearly constant proportion of sixty percent. of the former and forty percent. of the latter. The sweetening power of this mixture is about three-hundred times as great as that of common sugar, while the pure anhydro-orthosulphamin-benzoic acid is yet about forty percent. sweeter. The separation of the two acids from each other has, however, heretofore presented considerable difficulties, because the solubility of the acids themselves, as well as that of their salts, in water and other solvents is nearly the same. The only available method of separating the free acids has been by means of sulphuric ether, but this method is expensive and dangerous and also imperfect, inasmuch as the purified saccharin produced according to the same, still contains ten percent. and more of the parasulphamin-benzoic acid.

For the sake of brevity and simplicity of expression I shall, in the following part of this specification, call the anhydro-orthosulphamin-benzoic acid the "ortho-acid," and the parasulphamin-benzoic-acid the "para-acid."

This invention consists in a new method for attaining the separation of the said acids in a complete and convenient manner. The method is based on the property inherent in the two acids and discovered by me, that the ortho-acid $C_7H_5NSO_3$ has greater affinity to alkalies and alkaline earths than the para-acid $C_7H_7NSO_4$. If, therefore, a mixture of the ortho and para acids is treated in an aqueous solution with so much alkali as is chemically equivalent to the ortho-acid, the alkali will combine with the latter only, while the para-acid remains unchanged.

For carrying out the invention, a dry mixture of the ortho and para-acids, such as constitutes the crude saccharin, is brought into an aqueous solution of an alkali, an alkaline earth or a carbonate thereof, containing about such quantity of alkali or alkaline earth as is requisite to neutralize the ortho-acid only. Thus with caustic potash (KOH) about fifty-five parts by weight thereof would have to be used to one hundred and eighty-five parts by weight of ortho-acid ($C_7H_5O_3SN$). Under these conditions the ortho-acid combines with the alkali or alkaline earth to form therewith the corresponding salt, which dissolves, while the para-acid remains undissolved, so that it may be separated from the solution of the salt of ortho-acid.

In view of producing the ortho-acid from the filtrate, the latter is subjected to the action of a suitable acid (preferably a mineral acid) stronger than the ortho-acid, with the effect of precipitating the said ortho-acid, which is finally washed, and, if desired, recrystallized, in order to be converted into pure commercial saccharin.

I claim as my invention—

The process of producing anhydro-ortho sulphamin-benzoic acid, from a mixture of the said acid and para-sulphamin-benzoic acid, which consists in introducing the said mixture in dry condition into an aqueous solution of an alkali, an alkaline earth or a carbonate of alkali or alkaline earth, containing such quantity of the alkali or alkaline earth as will neutralize and dissolve only the anhydro-orthosulphamin-benzoic acid, filtering off the liquid from the undissolved para-sulphamin-benzoic acid, and adding to the filtrate an acid such as specified stronger than the anhydro-orthosulphamin-benzoic acid, whereby the latter, or pure saccharin, is precipitated, substantially as described.

In testimony whereof I have hereunto set my hand in the presence of two subscribing witnesses.

CONSTANTIN FAHLBERG.

Witnesses:
GUSTAV WESEMEYER,
W. EGGELING.